United States Patent [19]
Tasaki et al.

[11] Patent Number: 5,479,607
[45] Date of Patent: Dec. 26, 1995

[54] VIDEO DATA PROCESSING SYSTEM

[75] Inventors: Shigemitsu Tasaki, Kawasaki; Shigeru Tsuyukubo; Takatoshi Ohta, both of Yokohama; Hiroshi Kyogoku, Tokyo; Akira Nagatomo, Yokohama, all of Japan

[73] Assignee: Canon Kabushiki Kaisha, Tokyo, Japan

[21] Appl. No.: 286,913

[22] Filed: Aug. 8, 1994

Related U.S. Application Data

[63] Continuation of Ser. No. 668,689, Mar. 7, 1991, abandoned, which is a continuation of Ser. No. 373,609, Jun. 28, 1989, abandoned, which is a continuation of Ser. No. 897,816, Aug. 19, 1986, abandoned.

[30] Foreign Application Priority Data

Aug. 22, 1985 [JP] Japan ................................ 50-182977
Aug. 22, 1985 [JP] Japan ................................ 50-182979

[51] Int. Cl.$^6$ .............................................. G06F 15/62
[52] U.S. Cl. ............................................................ 395/166
[58] Field of Search ................................ 395/157, 162, 395/164, 165, 166; 345/196, 201, 203

[56] References Cited

U.S. PATENT DOCUMENTS

| | | | |
|---|---|---|---|
| 4,542,376 | 9/1985 | Bass et al. | 340/724 |
| 4,635,132 | 1/1987 | Nakamura | 358/296 |
| 4,694,352 | 9/1987 | Ina et al. | 358/287 |
| 4,700,320 | 10/1987 | Kapur | 364/521 |
| 5,077,678 | 12/1991 | Guttag et al. | 395/157 |

*Primary Examiner*—Phu K. Nguyen
*Attorney, Agent, or Firm*—Fitzpatrick, Cella, Harper & Scinto

[57] ABSTRACT

A video data processing system includes a CPU, a video memory, video data shift registers, a ternary counter, an octal counter, a blanking counter, and a flip-flop. Video data is shifted in the shift registers in response to an output from the ternary counter. The outputs from the ternary counter are counted by the octal counter, and an output from the octal counter is counted by the blanking counter so as to count down a blanking parameter. A borrow output from the blanking sets the flip-flop to hold video data which is then stored in the video memory. This operation is repeated up to the last H along the main scanning direction. The initial value of the blanking parameter is incremented by one by one to repeat main scanning inputs along a subscanning direction.

6 Claims, 12 Drawing Sheets

VIDEO DATA PROCESSING SYSTEM

This application is a continuation of application Ser. No. 07/668,689 filed Mar. 7, 1991, now abandoned, which is a continuation of application Ser. No. 07/373,609, filed Jun. 28, 1989, abandoned, which is a continuation of application Ser. No. 06/897,816 filed Aug. 19, 1986, abandoned.

BACKGROUND OF THE INVENTION

1. Field of the Invention

The present invention relates to a video data processing system and, more particularly, to a video data processing system consisting of one or more devices and adapted to send a high-speed scanned image signal from a CRT or the like to a low-speed recording device.

2. Related Background Art

Recording devices such as printers have been recently proposed to receive image data directly from a CRT and provide a hard copy. However, since image data from the CRT has a high speed, a buffer memory for storing data of a few main scanning lines is arranged in a conventional video data processing system. The CRT image is processed as a still image and the CRT data is stored in the buffer memory. After recording (printing) of the first few lines is completed, the data of the first few lines is erased and data of the next few lines is then stored in the buffer memory. Printing is repeated in this manner to provide a hard copy of the CRT screen image. This conventional recording scheme requires a long period of time for printing a one-frame image. In particular, when a color image is to be printed, a large number of data are required. In addition, in association with a printing scheme, printing requires a longer period of time. For example, a one-frame CRT image of 640×400 dots requires four minutes to be printed out as a hard copy. For this reason, the throughput of the host computer is decreased. Moreover, it takes a longer period of time to print out a color CRT image. Therefore, there is no room for practical applications in the conventional video data processing systems.

On the other hand, in order to receive a one-frame scanned CRT image so as to achieve high-speed video data processing, a large-capacity, expensive memory must be used. In addition, hardware for controlling high-speed processing must also be used, which is uneconomical.

Furthermore, there are no conventional video data processing systems which allow processing of scanned image signals having different signal levels and different image sizes as well as outputting thereof.

SUMMARY OF THE INVENTION

The present invention has been made in consideration of the conventional drawbacks described above, and has as its object to provide a simple video data processing system capable of receiving and retaining a high-speed scanned image signal and processing it at a practical speed.

It is another object of the present invention to provide a simple video data processing system capable of receiving video signals of different display schemes and signal levels.

It is still another object of the present invention to provide a video data processing system capable of signalling to an operator whether video data is being received, thereby providing good operability.

It is still another object of the present invention to provide a simple video data processing system capable of receiving and retaining a high-speed scanned color image signal and processing it at a practical processing speed.

DETAILED DESCRIPTION OF THE PREFERRED EMBODIMENTS

Preferred embodiments of the present invention will be described with reference to the accompanying drawings. A video data processing system according to the present invention consists of one or more units.

Figure 1:
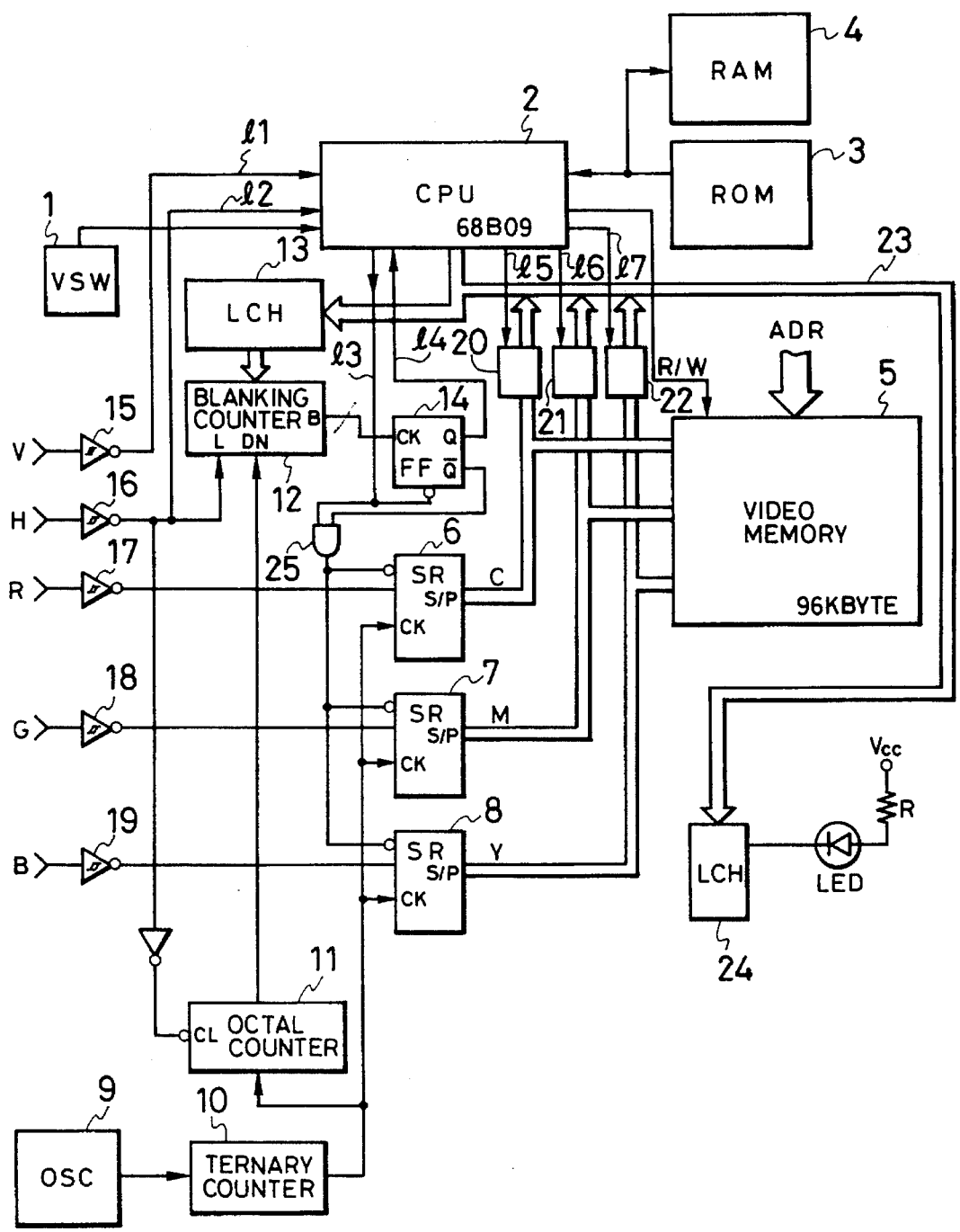
FIG. 1 is a block diagram of a video data processing system according to a first or second embodiment of the present invention.
Figure 2A:
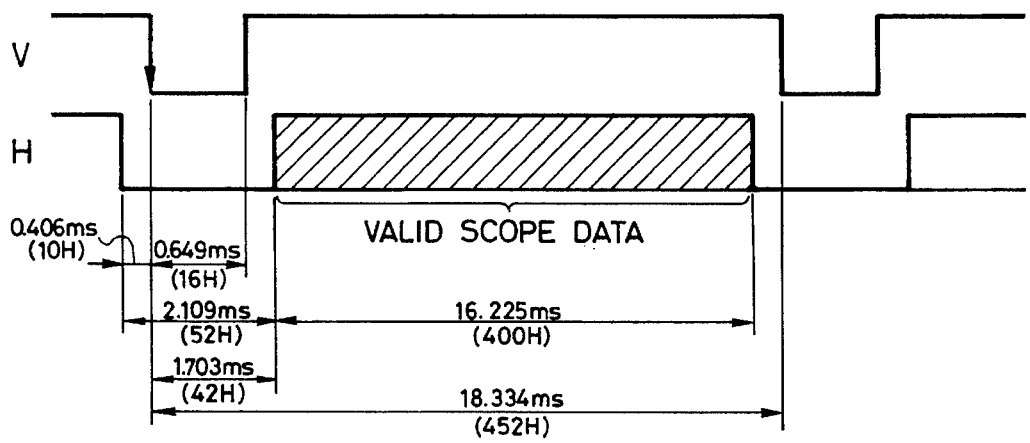
FIGS. 2A and 2B are charts for explaining the CRT display timings.
Figure 2B:
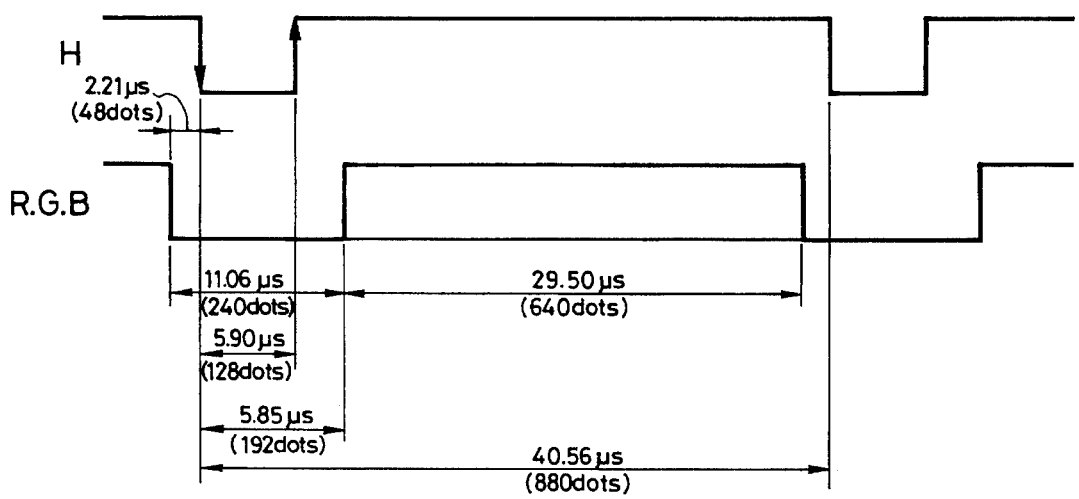
Figure 3:
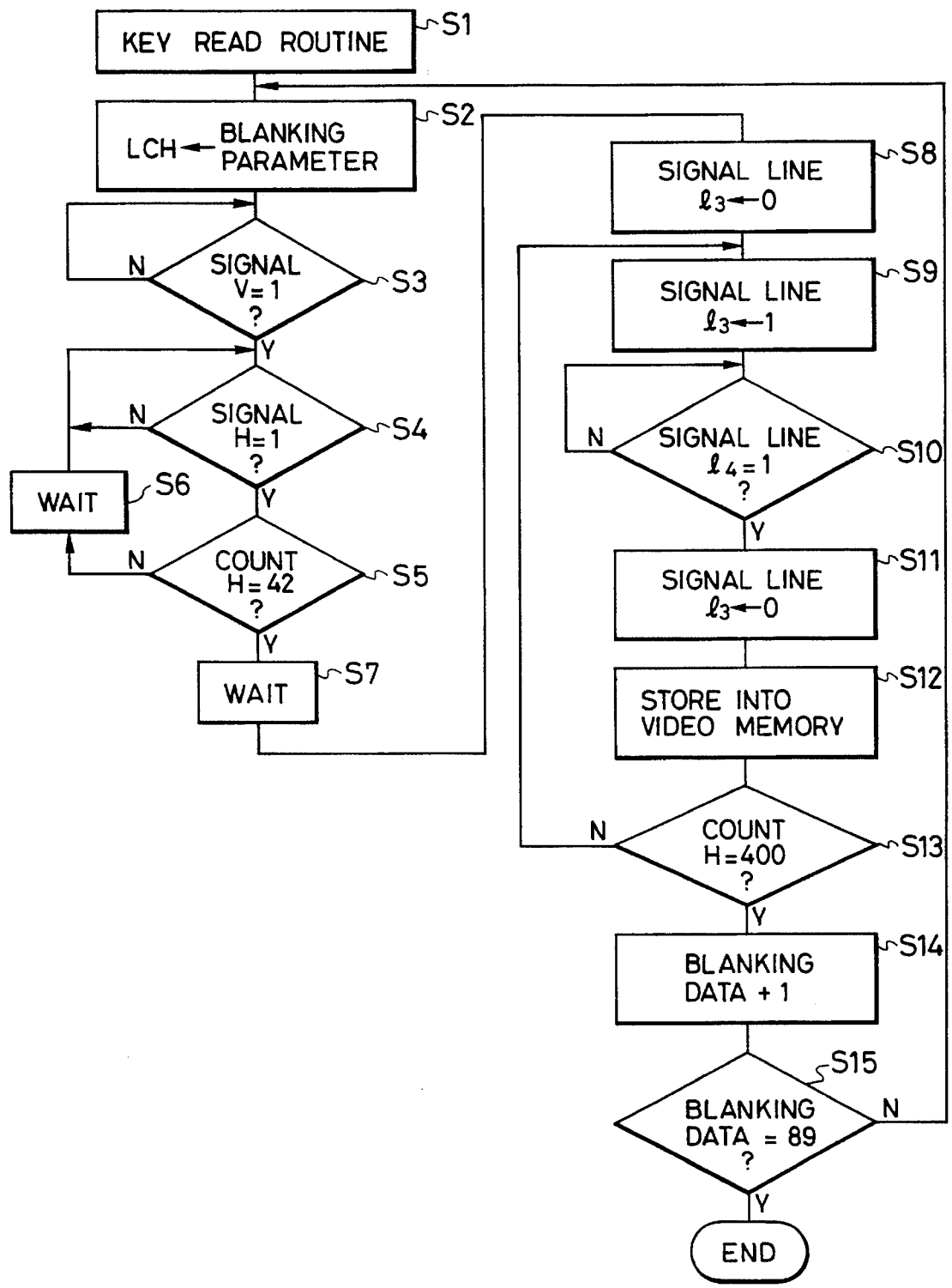
FIG. 3 is a flow chart for explaining video data processing control according to the first embodiment of the present invention.
Figure 4:
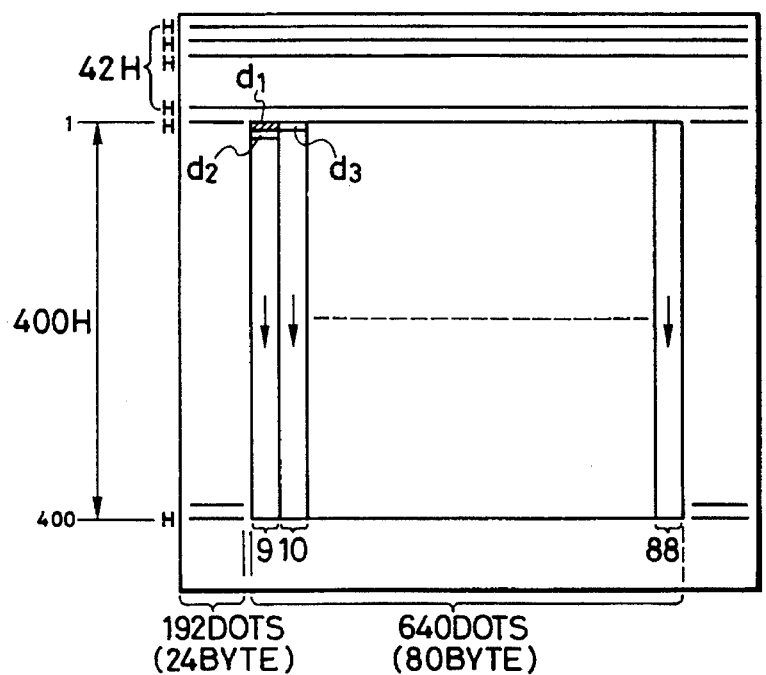
FIG. 4 is a chart showing the relationship between CRT display and data processing according to the first embodiment of the present invention.

FIGS. 1 to 4 are views of a first embodiment according to the present invention, in which FIG. 1 is a block diagram of a video data processing system thereof, FIGS. 2A and 2B are charts for explaining the CRT display timings, FIG. 3 is a flow chart showing video data processing control, and FIG. 4 is a chart showing the relationship between CRT display and data processing. Referring to FIG. 1, the video data processing system includes a switch (VSW) 1 for causing the system to start video data reception, a CPU (Central Processing Unit) 2 for controlling the system as a whole, a ROM (Read-Only Memory) 3 for storing a program shown in FIG. 3 or 5, a RAM (Random Access Memory) 4 for temporarily storing data required for operations under the control of the CPU 2, and a video memory (VRAM) 5 for storing the received video data. The VRAM 5 has a capacity of 96 kbytes. The video data processing system also includes shift registers (SR) 6 to 8, a pulse oscillator (OSC) 9, a ternary counter 10, an octal counter 11, a blanking (down) counter 12, a latch (LCH) 13, a flip-flop (FF) 14, Schmitt inverters 15 to 19, tristate gate buffers 20 to 22, an I/O bus 23 of the CPU 2, and a data LCH 24. The SRs 6 to 8 respectively convert serial cyan, magenta, and yellow data signals R, G, and B into parallel signals C, M, and Y. The OSC 9 generates an oscillation signal having a frequency three times the rated frequency of the video data. The ternary counter 10 divides the frequency of the output from the OSC 9 into ⅓. The octal counter 11 counts outputs from the ternary counter 10. The blanking counter 12 synchronizes the horizontal scanning line with the image data to be received. The LCH 13 supplies blanking pulses to the blanking counter 12. The FF 14 detects the timing for available state of the received data and signals it to the CPU 2. The Schmitt inverters 15 and 19 respectively receive a horizontal sync signal H, a vertical sync signal V, and the red, green, and blue video signals R, G, and B from a CRT unit (not shown). The tristate gate buffers 20 to 22 supply the video data from the memory 5 to an external device such as a printer. The data LCH 24 latches data to drive an indicator LED.

The transfer timings of the color video data signals R, G and B are indicated with respect to the vertical and horizontal sync signals V and H of the CRT. For example, the 43rd signal H (i.e., the 43rd scanning line) from the trailing edge of the signal V in FIG. 2A is shown in FIG. 2B. The 640-dot video data signals R, G, and B enabled at the trailing edge of the signal H are shown in FIG. 2B. Since 640-dot pixels are aligned along the horizontal direction (i.e., the main scanning direction) and 400 signals H (i.e., 400 scanning lines) starting from the 43rd scanning line are present along the vertical direction (i.e., the subscanning direction), the data processing system of this embodiment receives scope or image data of 640×400 dots.

The CRT data processing operation will be described with reference to FIGS. 1 to 3. When the video data reception switch VSW in FIG. 1 is turned on, the CPU 2 detects closing of the switch VSW and executes a key read routine in step S1. The CPU 2 sets blanking parameter "8" in the LCH 13 through the bus line 23 (step S2). This blanking parameter is 8-byte count data for neglecting 64-dot data (192 to 128) from the leading edge of the signal H in FIG. 2B. When the CPU 2 completes the system initialization, the CPU 2 starts detecting the signal V. When the signal V is input to the CPU 2 through the Schmitt inverter 15 and a signal line 11, the vertical synchronization of the scope or frame is established (step S3). The CPU 2 then detects the signal H through the Schmitt inverter 16 and a signal line 42 (step S4) and counts the number of signals H (step S5). When the CPU 2 counts the 42nd signal H, a signal line 43 is disabled to clear the FF 14 (step S8). At the same time, the content (initially "8" in this embodiment) of the LCH 13 is loaded in the counter 12 in response to the signal H, thereby resetting the octal counter 11. In addition, the CPU 2 enables the signal line 13 to be logic "1" (step S9) and waits until a signal line 14 goes high (i.e., until the FF 14 is set) in step S10.

The data processing cycle is started in hardware. The video data signals C, M, and Y are shifted in the SRs 6 to 8 in response to clocks from the ternary counter 10. In this case, the CRT primary color signals R, G, and B are inverted by the Schmitt inverters 17 to 19 so that the inverters 17 to 19 output complementary color signals C, M, and Y, respectively. An output from the ternary counter 10 is counted by the octal counter 11. An output from the counter 11 for every 8 counts (dots) is supplied to the counter 12 so that the value of the blanking parameter of the counter 12 is counted down. More specifically, the content "8" of the parameter is counted down in response to the output from the octal counter 11. When the counter 12 receives the ninth output pulse from the counter 11, the counter 12 outputs a borrow output which sets the FF 14. The FF 14 sends a Q output (the signal line 14) to the CPU 2. The Q output indicates that the 8-dot (one-byte) video data shifted in the SRs 6 to 8 in response to the output from the ternary counter 10 is valid. The value "8" set in the LCH 13 represents 64 blanking (192−128=64) dots between the leading edge of the signal H in FIG. 2B and the scope data. In other words, the data up to the 8th byte is not received. If the borrow output is generated by the down counter 12, the corresponding 9th byte data represents the first eight dots (one byte) of the scanning line 640-dot data to be received. In this case, the $\overline{Q}$ output from the FF 14 is kept low. Therefore, one of the inputs to an AND gate 25 is disabled to fix the eight dots of the 9th byte stored in the SRs 6 to 8.

Upon detection of the "1" level of the signal line 14, the CPU 2 sets the signal line 13 to be logic "0" so that the 8-dot data is fixed, and at the same time, the FF 14 is reset (step 11). An address of the video memory 5 is accessed through an address signal line ADR, and the video data signals C, M, and Y are written in a memory area at the accessed address of the video memory 5 in response to a write instruction (a signal line R/W) (step S12).

A description has been provided with reference to the first byte (eight dots) of the first signal H (scanning line) among the 400 scanning lines constituting one-frame or one-scope data. The first byte corresponds to a location d1 in FIG. 4. If the count representing the number of signals H does not reach 400, i.e., if NO in step S13, the flow returns to step S9. The signal line 13 is set at logic "1", and the next scanning line data is received. In this cycle, the initial count of the counter 12 is "8", as described above. Whenever the ninth output is generated by the counter 11, the counter 12 generates a borrow output to set the FF 14. The signal line #4 goes to logic "1". The first eight dots (one byte) of the second H are set in the SRs 6 to 8, so that its detection signal is sent to the CPU 2. The CPU 2 increments the memory address by one and then the data signals C, M, and Y are stored in the video memory 5 (step S12). These data signals are indicated by d2 in FIG. 4.

The operation is repeated in the manner as described above up to the 400th H (the scanning line) so that data of eight vertical dots by 640 horizontal dots is stored. When the CPU 2 determines that data storage has been completed up to the 400th H (excluding the first 42 Hs) in step S13, the blanking data is incremented by one in step S14. The CPU 2 checks in step S15 whether the value is "89" (i.e., 8 (the first blanking number) +80 bytes (i.e., 640 dots) +1). If NO in step S15, the flow returns to step S2, and the next data is received. The first blanking data represents "8" and storage of the vertical data of the first byte in the 640 horizontal dots has been completed. A value obtained by adding one to the current blanking data is set in the LCH 13. The data up to the nine horizontal bytes after the leading edge of the signal H is neglected. Data of 400 Hs from d3 of the 10th byte in FIG. 4 is received in the same manner as in FIG. 4. By repeating the operation described above, the entire CRT frame or scope data of 80 bytes×400 Hs is received. Then YES is obtained in step S15, i.e., the CPU 2 determines that the value of the blanking data reaches "89", and video data processing is completed. For example, the time required for this processing is equal to the repetition period of 80 signals V, i.e., about 1.5 seconds, which results in a practical time.

Data is continuously received in units of scanning lines in the first embodiment. However, if data cannot be stored in units of scanning lines, or a CRT device employs interfaced Scanning, the data is stored in the video memory 5 for every other scanning line. For example, data on the odd-numbered scanning lines is first stored in the memory, and data on the even-numbered scanning lines is then stored therein. In this case, the order of the odd- and even-numbered scanning lines may be reversed.

Figure 6:
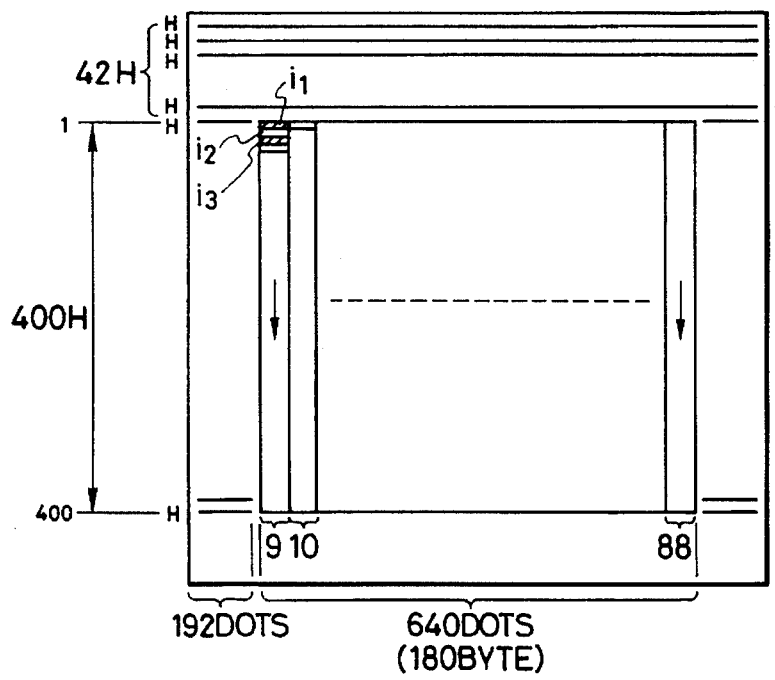
FIG. 6 is a chart showing the relationship between the CRT display and data processing according to the second embodiment of the present invention.
Figure 5A:
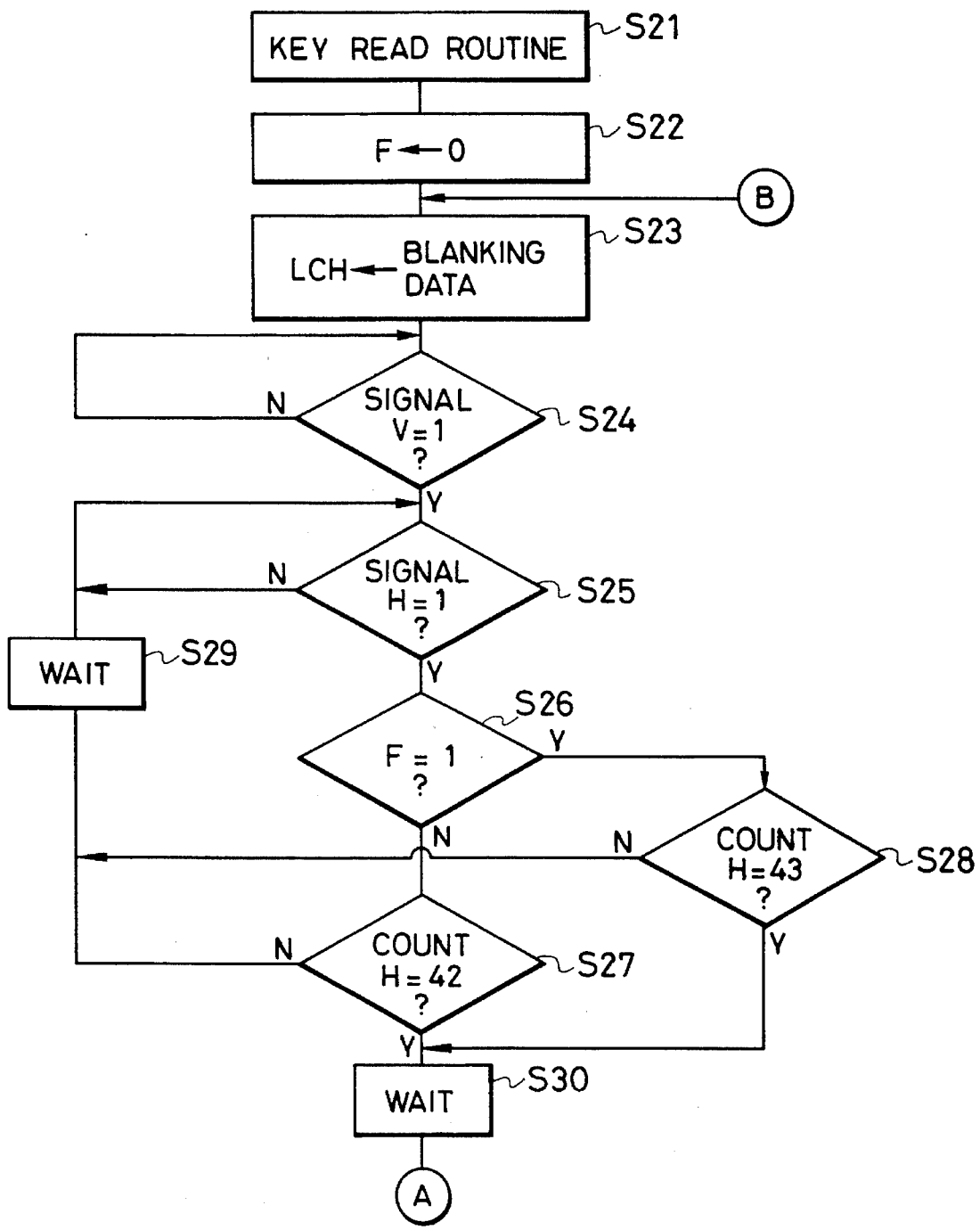
FIGS. 5A and 5B are flow charts for explaining the interlaced video data processing control according to the second embodiment of the present invention.
Figure 5B:
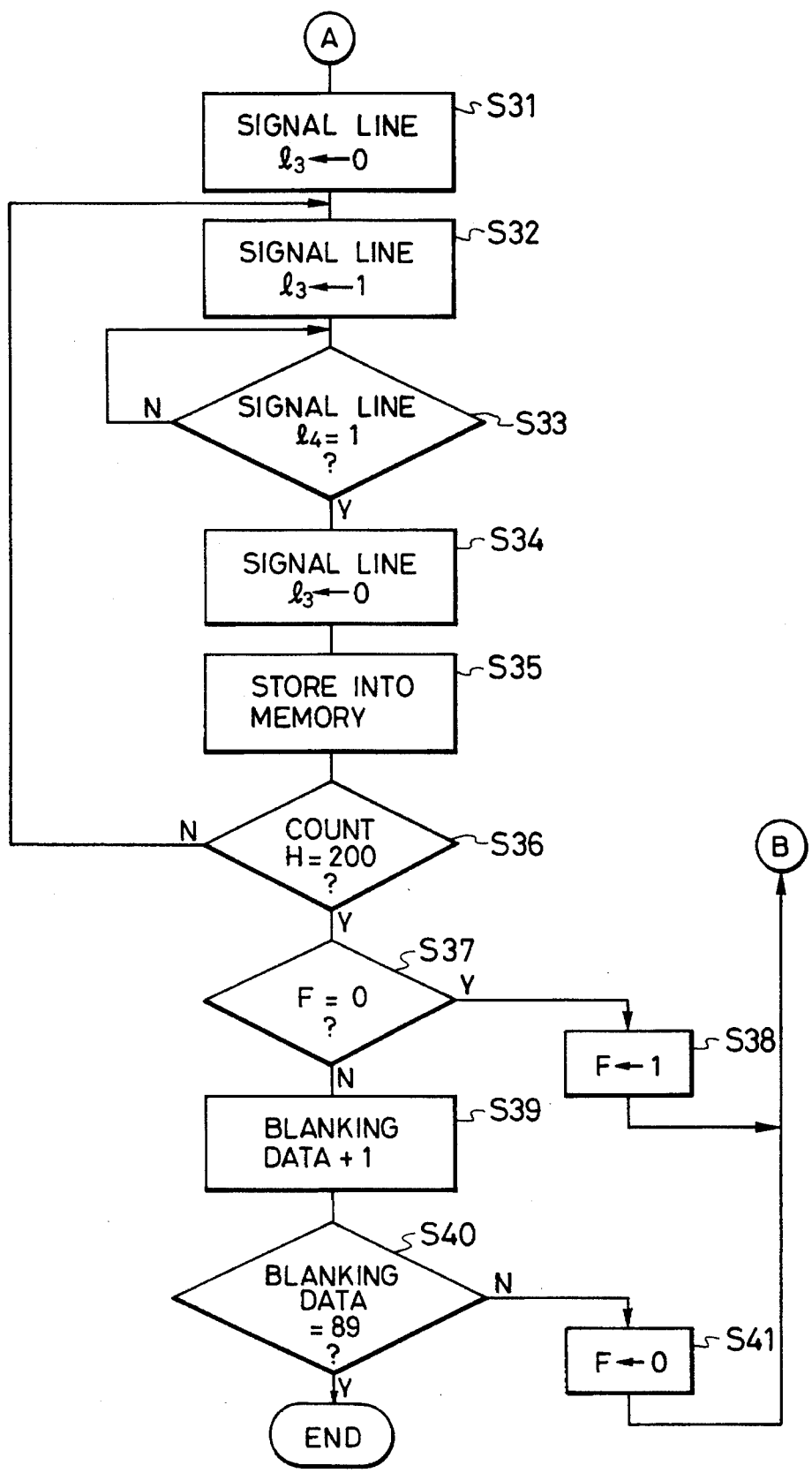

FIGS. 5 and 6 show a second embodiment of the present invention, in which FIG. 5 is a flow chart showing interlaced video data processing control, and FIG. 6 shows the relationship between CRT display and data processing. The block diagram of the circuit of the second embodiment is the same as that of the first embodiment in FIG. 1. A CPU 2 in the second embodiment includes a flag F for discriminating an odd-numbered scanning line from an even-numbered scanning line. An odd-numbered scanning line corresponds to F=0, and an even-numbered scanning line corresponds to F=1.

When the video data reception start switch VSW is turned on, the CPU 2 detects closing of the switch VSW and starts to receive the CRT scope data (step S21). In order to first receive data on the odd-numbered scanning lines, F=0 is set (step S22). Blanking data (e.g., "8") is stored in an LCH 13 through a bus 23 (step S23). The signal V is detected (step S24). If the signal V is input to the CPU 2 through a Schmitt inverter 15 and a signal line 11, the CPU 2 detects synchronization with the scope or frame. The CPU 2 then detects and counts the signals H (step S25). The CPU 2 detects and counts the level "1" of the signal H through a Schmitt inverter 16 and a signal line 12. Since the first blanking numbers of the odd- and even-numbered scanning lines differ from each other, the CPU 2 detects a count H=42 (step S27) for the odd-numbered scanning lines (F=0) and a count H=43 (step S28) for the even-numbered scanning lines (F=1). When the detected count reaches the preset count, the level of a signal line 13 is set at logic "0", and an FF 14 is cleared (step S31). The signal line 13 is set at logic "1" (step S32), and the CPU 2 waits until a signal line 14 goes to high level, i.e., logic "1" (step S33). A blanking counter 12 outputs a borrow signal and then the FF 14 is set, so that the $\overline{Q}$ output from the FF 14 causes SRs 6 to 8 to hold eight dots of the 9th byte. The held data is detected as valid video data according to the Q output from the FF 14 under the control of the CPU 2 via the signal line 14 (step S33). Upon detection of this signal, the CPU 2 sets the signal line 13 at logic "0" (step S34) to reset the FF 14. At the same time, the data holding state of the SRs 6 to 8 is maintained. An address of a video memory 5 is accessed via an address signal line ADR, and data signals C, M, and Y are written in the video memory 5 (step S35).

Reception of the first one-byte (eight dots) data of the first (the odd-numbered scanning line) signal H of 400 data scanning lines 400 of the scope or frame has been described. If reception of 200 Hs on the odd-numbered scanning lines is determined not to be completed in step S36, the flow returns to step S32. The signal line 3 is set at logic "1", and data on the next relative odd-numbered scanning line 3H (the next scanning line in the interlaced scanning) is received. In the same manner as described above, blanking data "8" is set in the counter 12. When the ninth output is generated by an octal counter 11, the counter 12 generates a borrow output to set the FF 14. The signal line 4 is set at logic "1". The first eight dots (one byte) of the second odd-numbered scanning line are set in the SRs 6 to 8, and its detection signal is sent to the CPU 2. The address of the video memory 5 is set, and the corresponding data signals C, M, and Y are stored therein. The data signals are indicated by i3 in FIG. 6. When the control sequence described above is repeated until the odd-numbered scanning line reaches the 200th H, data of every other dots up to the 8th dot by 640 horizontal dots of one scope or frame is stored in the video memory 5. The end of scanning for the odd- or even-numbered scanning lines is determined by the logic level of the flag F (step S37). In the above case, the CPU 2 determines the end of scanning of the odd-numbered scanning lines and sets the flag F to be logic "1" (step S38), and the flow returns to step S23. Data of even-numbered scanning lines is received from the first signal V. This operation is performed under the condition that the number of signals H for neglecting data reception is incremented by one to be 43 H (step S28). More specifically, data of 200 bytes from the 44th (the second) signal H is received for every even-numbered scanning line in the same manner as for odd-numbered scanning lines. When data of 200 Hs on the even-numbered scanning lines is completed, the flow advances to step S39. The blanking data (its initial value is "8") is incremented by one to determine whether processing of data of 640×400 dots as one-frame or one-scope data) is completed (step S39). Since the CPU 2 determines in step S40 that the value of the blanking data is not "89" (i.e., the initial blanking data value "8" +80 bytes (i.e., 640 dots) +1), the CPU 2 sets the flag F at logic "0", and data reception for the odd-numbered scanning lines is performed (step S41). The next data is then received. More specifically, the blanking data represents value "8" and data of one byte in the 640 horizontal dots is completed. The data obtained by incrementing the blanking data by one is set in the LCH 13 (step S23). Data of the first to ninth horizontal bytes is neglected. The 10th byte data is received in a total of 400 Hs, i.e., 200 Hs for the odd-numbered scanning lines and 200 Hs for the even-numbered scanning lines. When CRT data of 80 bytes ×400 Hs is received by repeating the above operation, the value of the blanking data reaches "89" (step S40). Therefore, one-frame data is stored in the memory. The total storage time is about 3 seconds (about 1.5 seconds for interlaced scanning) since 160 signals V are generated.

Until the switch VSW is turned on to start CRT data reception and data is stored in the video memory 5, the CPU 2 keeps the LED on through the bus line 23 and an LCH 24. Upon completion of the storage of data in the video memory 5, the LED is turned off. Therefore, the operator can confirm that the CRT data has been stored in the video memory. The lamp may be replaced with a buzzer.

Figure 7:
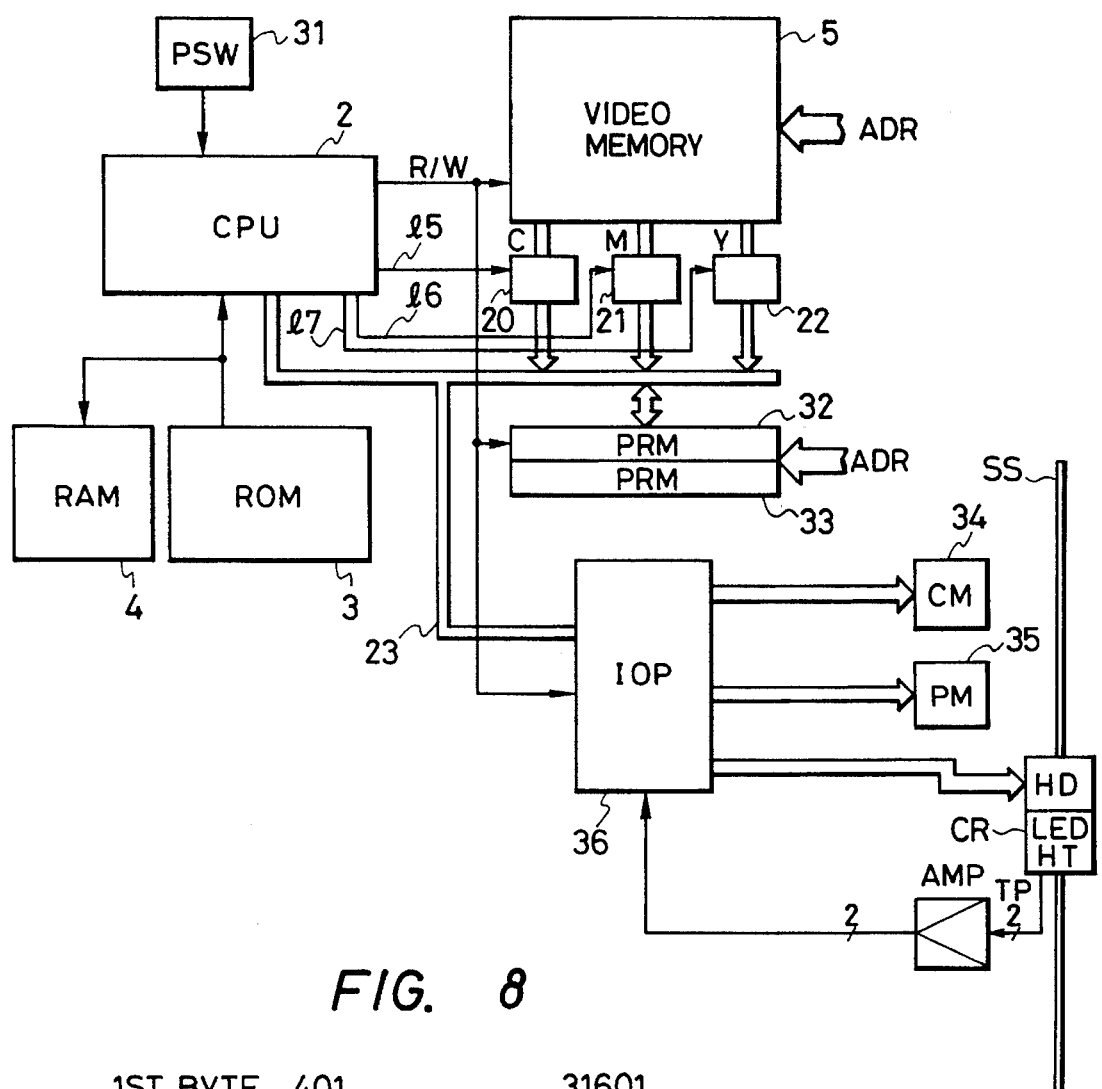
FIG. 7 is a block diagram of a printing controller.
Figure 8:
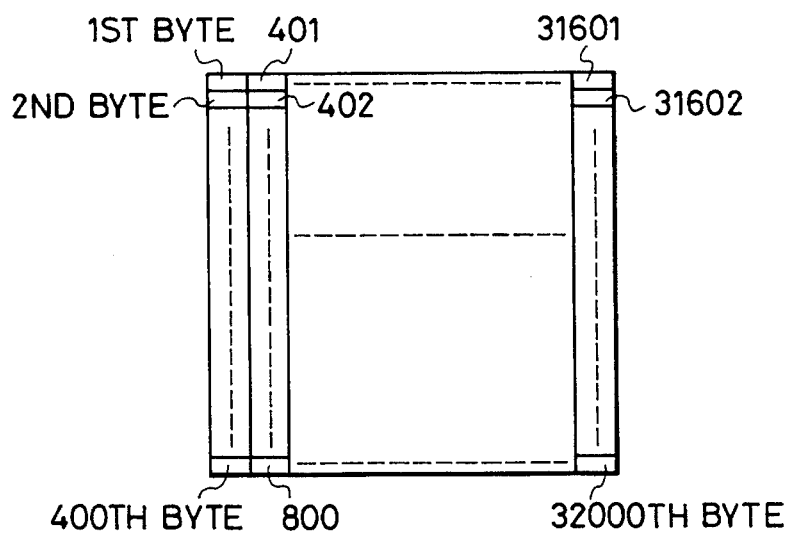
FIG. 8 is a chart showing a printing surface.

The operation for printing the CRT data stored in the video memory 5 will be described below. FIG. 7 is a block diagram of a printing controller, and FIG. 8 shows a printing surface. A printer is exemplified by a color ink jet printer with cyan (C), magenta (M), yellow (Y), and black (B) ink jet heads. The same reference numerals as in FIG. 1 denote the same parts in FIG. 7, and a detailed description thereof will be omitted. The printing controller in FIG. 7 includes a printing switch (PSW) 31 for initiating printout, printing buffer memories (PRMs) 32 and 33 for temporarily storing printing data, and a carriage motor (CM) 34 for moving a carriage CR in the right-and-left direction with respect to paper (not shown). An ink jet head unit HD of the C, M, Y, and B heads and a photocoupler, consisting of a light-emitting diode LED and a phototransistor HT to detect a timing pulse TP through a slit SS so as to control the printing position and speed, are mounted on the carriage CR. The printing controller also includes a paper feed pulse motor (PM) 35 for feeding printing paper, and an input/output port (IOP) 36 for controlling printing.

The video data is stored in the video memory 5 in units of color components (i.e., C, M, and Y). The color component signals are stored from the first byte to 32,000 bytes along the column direction of the CRT screen. 160-byte data of two rows of the CRT screen is read out and printed upon reciprocal movement of the carriage CR with the C, M, Y, and B heads. More specifically, when the PSW 31 is turned on, the CPU 2 sequentially enables and disables tristate gates 20 to 22 through signal lines 15 to 17 in FIG. 7. Data of the first byte in FIG. 8 is stored in the PRM 32. Data of the 401st byte in FIG. 8 is accessed to store it in the video memory 5 upon enabling/disabling of the tristate gates 20 to 22 via the signal lines 15 to 17. By repeating the above operation, the horizontal data signals C, M, and Y up to the 31,601st byte are stored in the PRM 32. Thereafter, horizontal C, M, and Y data up to the second to 31,602nd bytes is stored in the PRM 33. If all the C, M, and Y data signals are set at logic "1", the designated color is black. Black data is set in units of horizontal dots, if necessary. The carriage CR is operated to perform printing. More specifically, the CPU 2 causes a motor CM to drive the carriage CR through the IOP 36. The printing position is checked in response to the timing signal TP detected through the slit SS upon driving the carriage CR. The C, M, Y, and (B) data signals along the horizontal direction from the first byte to 31,601st bytes in the PRM 32 are sequentially read out and supplied to the printing head unit HD. The printing head unit injects the corresponding inks and performs printing. When the last eight dots of the 31,601st byte are printed, the carriage motor PC is driven in reverse to perform printing in the reverse direction. This reverse printing is achieved such that the C, M, Y, and (B) data signals from the 31,602nd byte to the second byte on the CRT along the horizontal direction are read out from the PRM 33 in response to the timing signals TP. The above operation is repeated up to data of 32,000th byte to 400th byte of the last line, and all CRT data printing is completed.

During reception and storage of the CRT data, if offset data is utilized instead of incrementing the address by one to obtain the same data array as in printing thereof, printing can be performed without using the printing buffers.

The printing switch PSW need not be used. In this case, all CRT scope or frame data may be automatically printed after its storage.

According to the first and second embodiments described above, the data is received from the CRT device within the practical time (i.e., about 1.5 to 3 seconds). Thereafter, even if the CRT data is modified, the data can be reproduced on the printout. The user need not wait for a few minutes without modifying the CRT data until printing is completed, unlike in the conventional computer system, thereby improving the operability in video data processing.

While the CRT data is stored in the memory, this operation is signalled to the user by an alarming means such as a lamp. Thus, the user can visually be informed of the operating period. Even if an alarming means such as a lamp is not used, the operating state can be recognized by the starting of automatic printing, thereby reducing operation errors and preventing the received data from being lost.

Data processing can be achieved by a simple configuration of a combination of hardware and software, thereby removing a complicated, expensive circuit arrangement constituted by only hardware, and hence simplifying the circuit excluding the memory and making the resultant system compact.

A third embodiment of the present invention will be described in detail with reference to the accompanying drawings.

Figure 9:
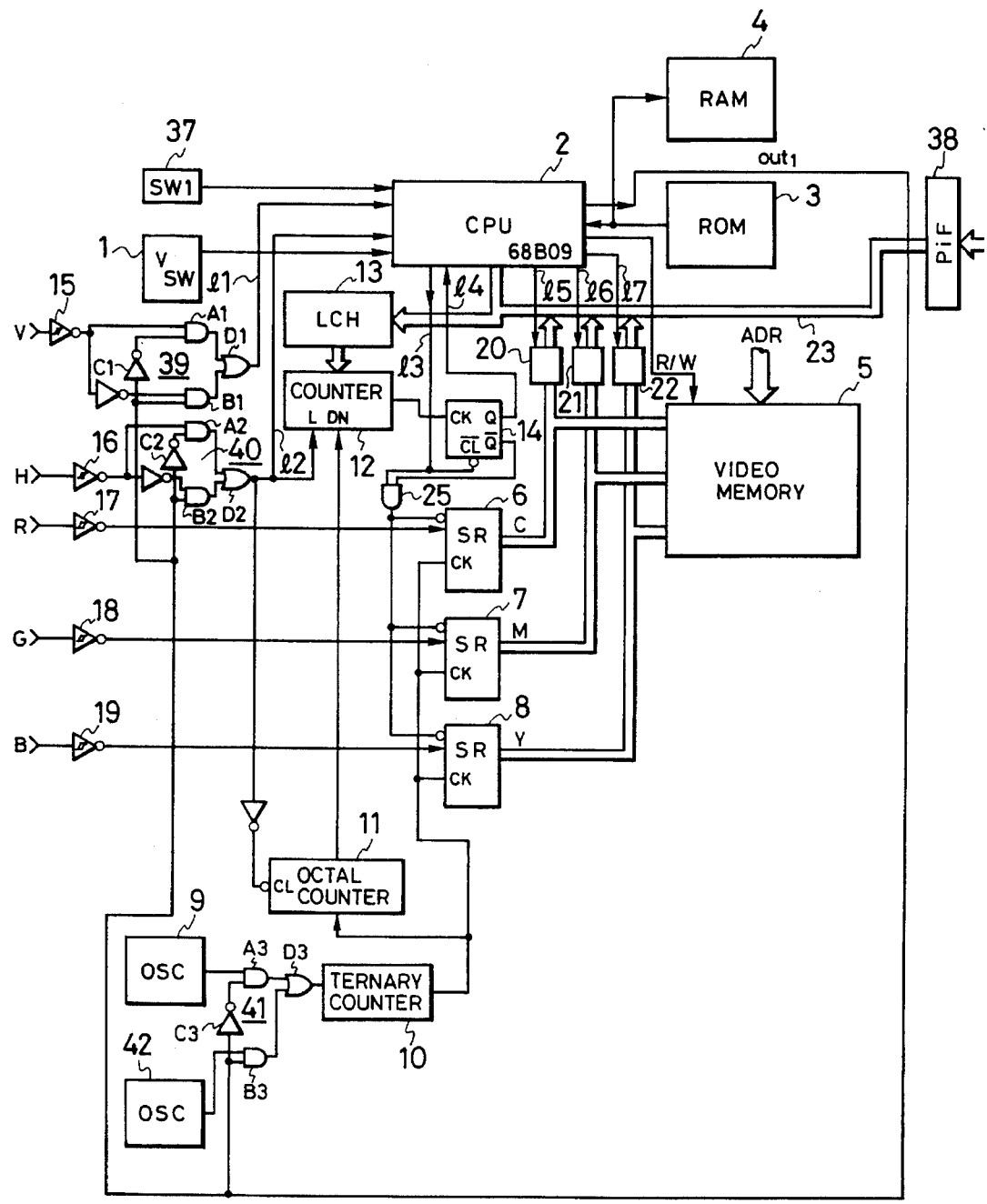
FIG. 9 is a block diagram of a video data processing system according to still another embodiment of the present invention.
Figure 10A:
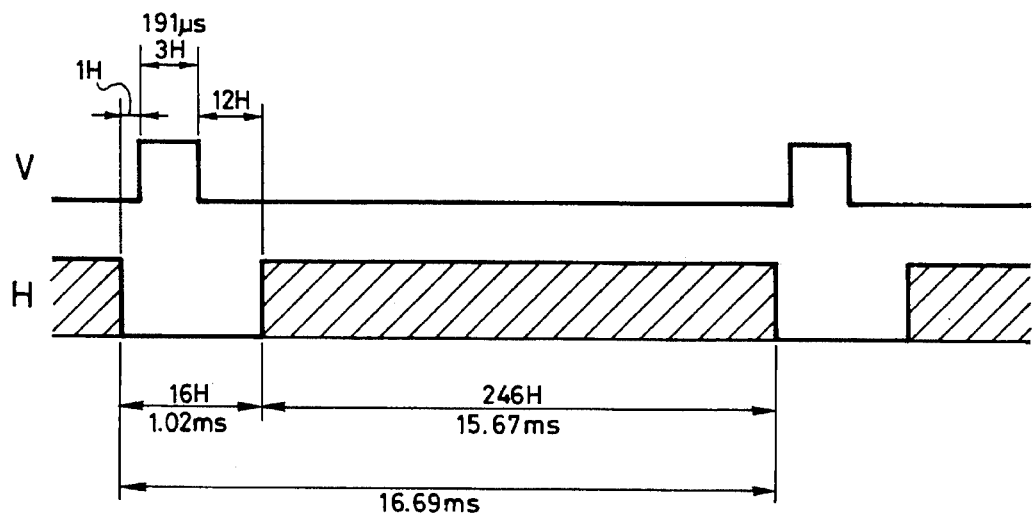
FIGS. 10A and 10B are charts for explaining the CRT display timings.
Figure 10B:
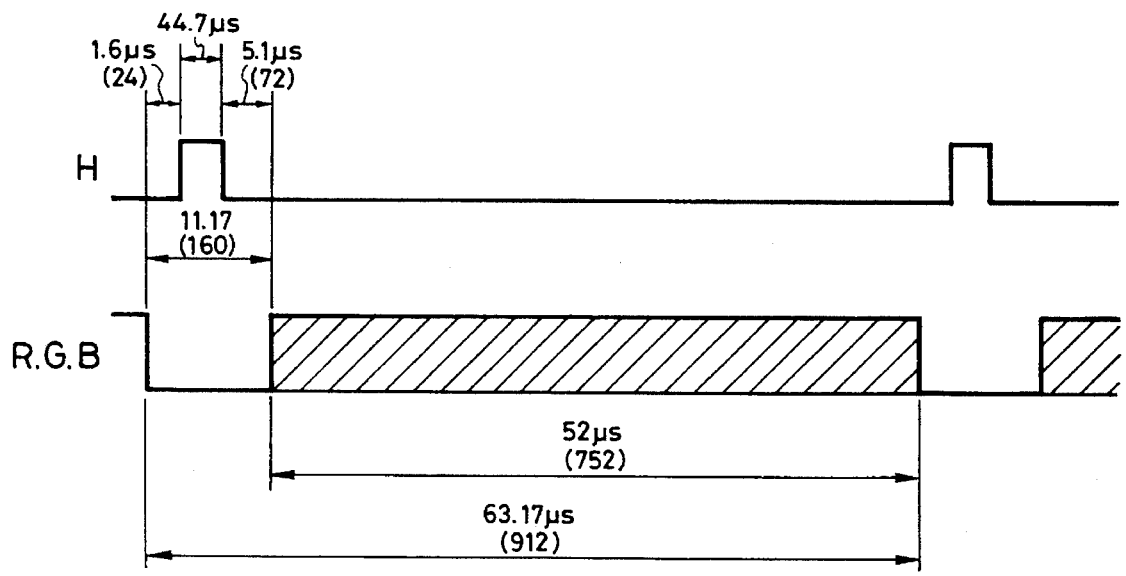
Figure 11A:
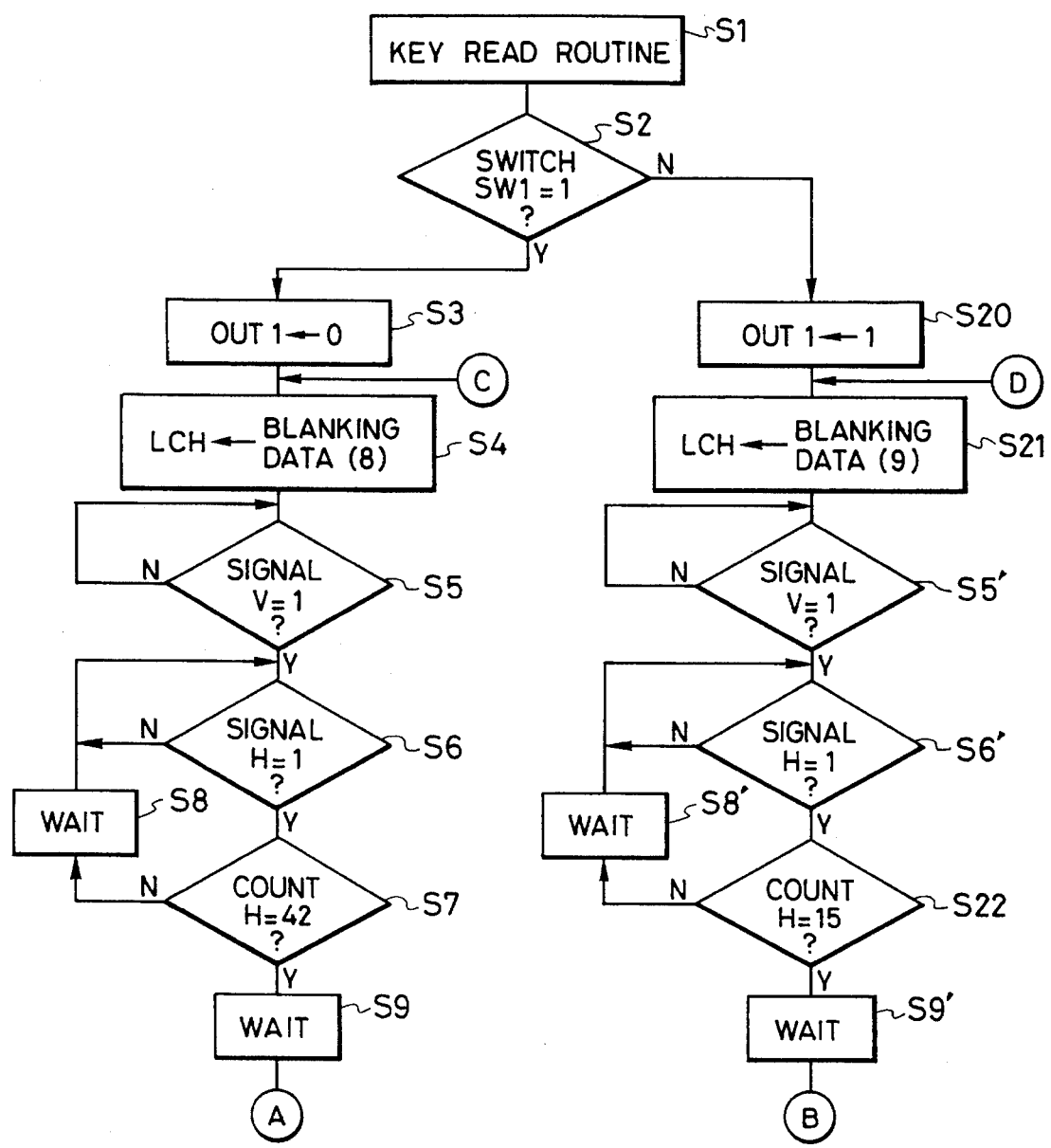
FIGS. 11A and 11B are flow charts for explaining video data processing control in the system shown in FIG. 9.
Figure 11B:
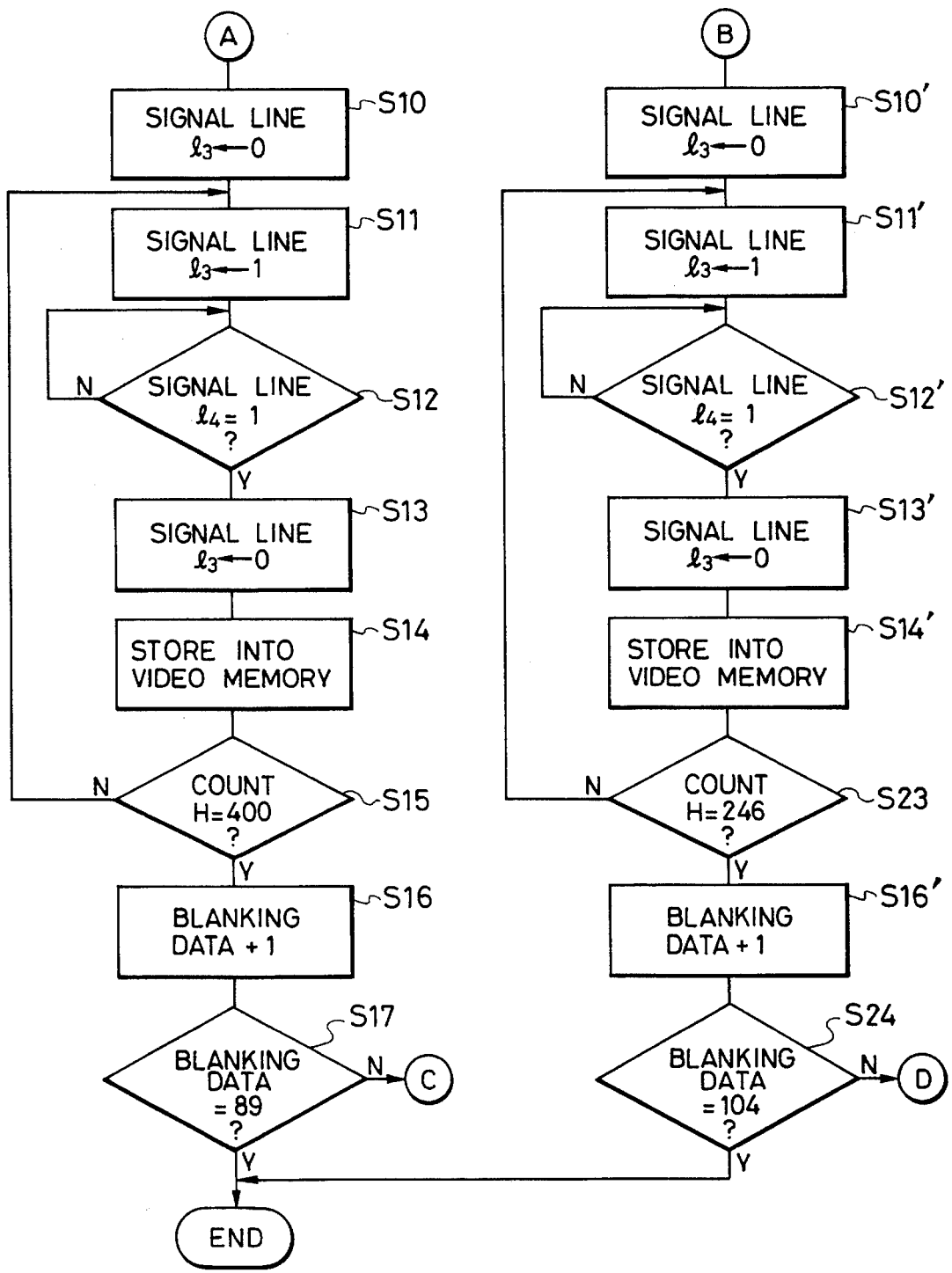
Figure 12:
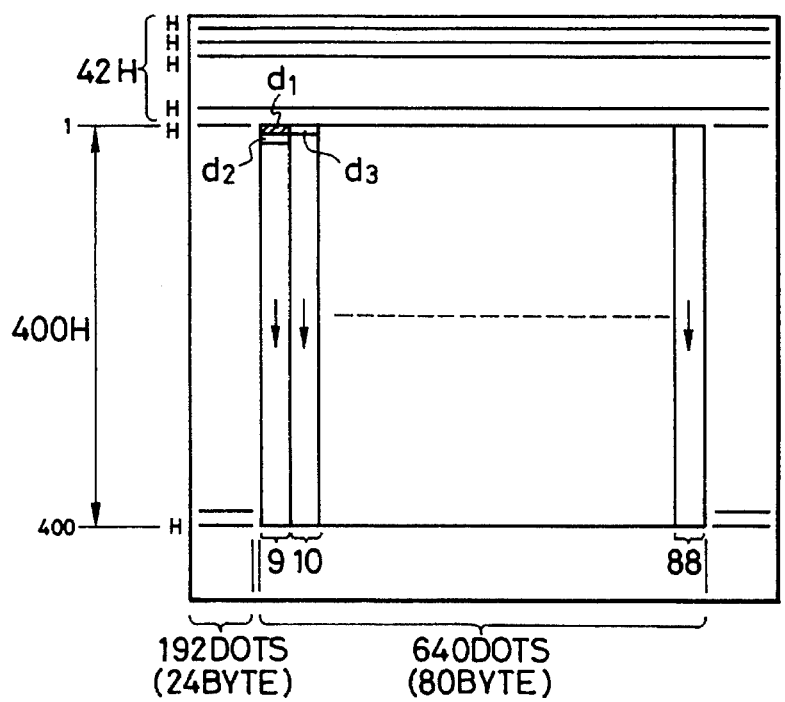
FIG. 12 is a chart showing the relationship between the CRT display and data processing of a first CRT.
Figure 13:
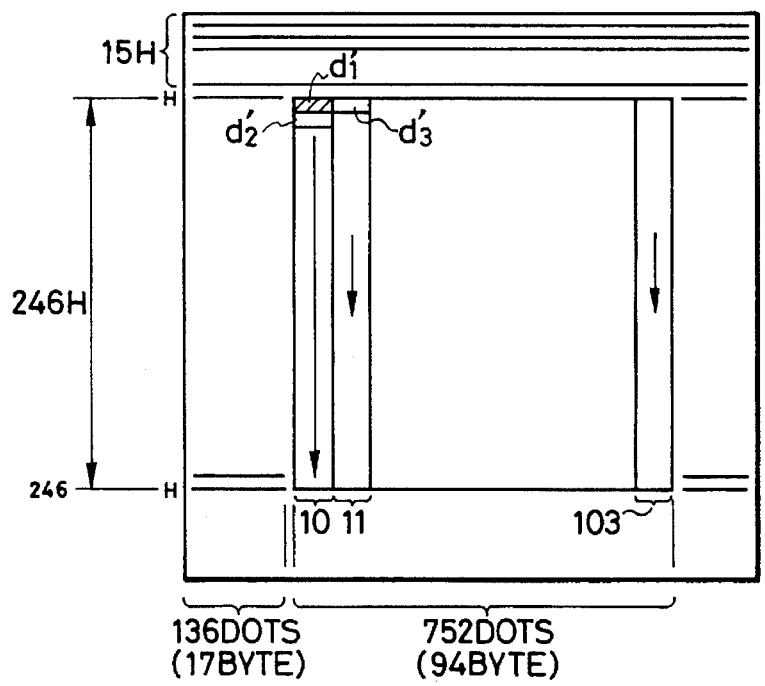
FIG. 13 is a chart showing the relationship between CRT display and data processing of a second CRT.

FIGS. 9 to 13 show the third embodiment, in which FIG. 9 is a block diagram of a video data processing system thereof, FIGS. 2A and 2B are charts showing display timings of the first CRT display in this embodiment, FIGS. 10A and 10B are charts showing display timings of the second CRT display, FIG. 11 is a flow chart showing video data processing control of this embodiment, FIG. 12 is a chart showing the relationship between data processing and the display scheme of the first CRT display, and FIG. 13 is a chart showing the relationship between data processing and the display scheme of the second CRT display.

Referring to FIG. 9, the video data processing system includes a switch (VSW) 1 for causing the system to start video data reception, a CPU (Central Processing Unit) 2 for controlling the overall operation of the system, a ROM (Read-Only Memory) 3 for storing the program shown in FIG. 11, a RAM (Random Access Memory) 4 for temporarily storing received video data, and a 96-kbyte video memory (VRAM) 6 for storing the received video data. The video data reception system also includes shift registers (SRs) 6 to 8, pulse oscillators (OSCs) 9 and 36, a ternary counter 10, an octal counter 11, a blanking (down) counter 12, an LCH 13, a flip-flop (FF) 14, Schmitt inverters 15 to 19, tristate gate buffers 20 to 22, an I/O bus 23 of the CPU 2, a switch 37, an interface (PiF) 38, and signal switching circuits 39 to 41. The SRs 6 to 8 convert serial cyan, magenta, and yellow video data signals C, M, and Y into parallel ones and buffer the converted data signals. The OSC 9 oscillates a signal having a frequency three times the rated frequency of the video data from the first CRT. The OSC 42 oscillates a signal having a frequency three times the rated frequency of the video data from the second CRT. The OSCs 9 and 42 can be easily switched in response to an external switching signal. The ternary counter 10 divides the frequency of the output from the OSC 9 or 42 into ⅓. The octal counter 11 counts the outputs from the ternary counter 10. The blanking or down counter 12 serves to synchronize the image data with the scanning lines of the first or second CRT (not shown). The LCH 13 holds the blanking data (numeric value) supplied to the counter 12. The FF 14 signals to the CPU 2 that the data processing timing is available. The Schmitt inverters 15 to 19 receive the signals (i.e., signals obtained by switching a horizontal sync signal H, a vertical sync signal V, and red (R), green (G), and blue (B) video signals by switching means) from the first or second CRT. The tristate gate buffers 20 to 22 output the video data read out from the video memory 5 to an external device such as a printer. The SW1 37 signals connection of the first or second CRT to the CPU 2. The PiF connects the bus 23 to a bus of an external device (e.g., a printer).

FIGS. 2A and 2B show the transfer timings of the color data signals R, G, and B with respect to the vertical and horizontal sync signals V and H of the first CRT. Referring to FIG. 2A, the 43rd H signal from the trailing edge of the signal V in FIG. 2A is shown in FIG. 2B. R, G, and B video data of 640 dots from the 193rd dot from the trailing edge of the 43rd H signal is shown in FIG. 2B. Since pixels of 640 dots are arranged in the horizontal direction (i.e., the main scanning direction) of the screen and 400H signals (scanning lines) starting from the 43rd H signal are generated along the vertical direction (i.e., the subscanning direction), 640×400 dots are received as one-scope or one-frame data of the first CRT by the video data processing system.

FIGS. 10A and 10B show the transfer timings of the color data signals R, G, and B with respect to the vertical and horizontal sync signals V and H of the second CRT. Referring to FIG. 10A, the 16th H signal from the trailing edge of the signal V in FIG. 2A is shown in FIG. 2B. R, G, and B video data of 752 dots from the 137th dot from the trailing edge of the 16th H signal is shown in FIG. 2B. Since pixels of 752 dots are arranged in the horizontal direction (i.e., the main scanning direction) of the screen and 246H signals (scanning lines) starting from the 16th H signal are generated along the vertical direction (i.e., the subscanning direction), 752×246 dots are received as one-scope or one-frame data of the first CRT by the video data processing system.

CRT data processing of the system according to this embodiment will be described hereinafter. If the video data reception switch VSW in FIG. 9 is turned on, the CPU 2 detects closing of the switch VSW and starts receiving CRT scope data (step S1). In this case, the CPU 2 checks in step 2 whether the output from the switch 37 is set at logic "1". If YES in step S2, the flow advances to step S3 and the subsequent steps so as to receive data from the first CRT. However, if NO in step S2, the flow advances to step S20 and the subsequent steps so as to receive data from the second CRT. Data processing from the first CRT will be first described. The CPU 2 sends out a signal of level "0" through a signal line out 1 to set the switching circuits 39 to 41 in the first CRT mode (step S3). In other words, the trailing timings of the vertical and horizontal sync signals V and H are used as reference timings. The output from the OSC 9 is used as the clock signal. In step S4, the CPU 2 then sets blanking parameter "8" in the LCH 13. This parameter is 8-byte count data for neglecting 64-dot data from the leading edge of the signal H in FIG. 2B. When the CPU 2 completes initialization, it detects the signal V. When the signal V is input to the CPU 2 through the Schmitt inverter 15 and the signal line 11, the CPU 2 establishes vertical synchronization on the screen of the first CRT (step S5). The CPU 2 then detects the signal H through the Schmitt inverter 16 and the signal line 12 (step S6) and then counts the number of signals H (step S7). When the CPU 2 counts 42 signals H, the CPU 2 sets the signal line 13 at logic "0" to clear the FF 14 (step S10). At the same time, the content (the initial value is 8 in this embodiment) of the LCH 13 is loaded in the counter 12 in response to the signal H, and the octal counter 11 is reset. The CPU 2 sets the signal line 13 at level "1" (step S11) and waits until the signal line 14 is set at logic "1" (the FF 14 is set) (step S12).

The data processing cycle is started in hardware. The video data signals C, M, and Y are shifted in the SRs 6 to 8 in response to clocks from the ternary counter 10. In this case, the CRT primary color signals R, G, and B are inverted by the Schmitt inverters 17 to 19 so that the inverters 17 to 19 output complementary color signals C, M, and Y, respectively. An output from the ternary counter 10 is counted by the octal counter 11. An output from the counter 11 for every 8 counts (dots) is supplied to the counter 12 so that the value of the blanking parameter of the counter 12 is counted down. More specifically, the content "8" of the parameter is counted down in response to the output from the octal counter 11. When the counter 12 receives the ninth output pulse from the counter 11, the counter 12 outputs a borrow output which sets the FF 14. The FF 14 sends a Q output (the signal line 14) to the CPU 2. The Q output represents that the 8-dot (one-byte) video data shifted in the SRs 6 to 8 in response to the output from the ternary counter 10 is valid. The value "8" set in the LCH 13 represents 64 blanking dots (192−128=64) between the leading edge of the signal H in FIG. 2B) and the scope data. In other words, the data up to the 8th byte is not received. When the borrow output is generated by the down counter 12, the corresponding 9th byte data represents the first eight dots (one byte) of the scanning line 640-dot data to be received. In this case, the Q̄ output from the FF 14 is kept low. Therefore, one of the inputs to an AND gate 25 is disabled to fix the eight dots of the 9th byte stored in the SRs 6 to 8.

Upon detection of the "1" level of the signal line 14, the CPU 2 sets the signal line 13 to be logic "0" so that the 8-dot data is fixed, and at the same time, the FF 14 is reset (step 13). An address of the video memory 5 is accessed through an address signal line ADR, and the video data signals C, M, and Y are written in a memory area at the accessed address of the video memory 5 in response to a write instruction (a signal line R/W) (step S14).

A description has been provided with reference to the first byte (eight dots) of the first signal H (scanning line) among the 400 scanning lines constituting one-frame or one-scope data. The first byte corresponds to a location d1 on the first CRT in FIG. 12. If the count representing the number of signals H has not reached 400, i.e., if NO in step S15, the flow returns to step S11. The signal line 13 is set at logic "1", and the next scanning line data is received. In this cycle, the initial count of the counter 12 is "8", as described above. Whenever the ninth output is generated by the counter 11, the counter 12 generates a borrow output to set the FF 14. The signal line 14 goes to logic "1". The first eight dots (one byte) of the second H are set in the SRs 6 to 8, so that its detection signal is sent to the CPU 2. The CPU 2 increments the memory address by one and then the data signals C, M, and Y are stored in the video memory 5 (steps S12 to S14). These data signals are indicated by d2 in FIG. 12.

The operation is repeated in the manner as described above up to the 400th H (the scanning line) so that data of eight vertical dots by 640 horizontal dots is stored. When the CPU 2 determines that data storage has been completed up to the 400th H (excluding the first 42 Hs) in step S15, the blanking data is incremented by one in step S16. The CPU 2 checks in step S17 whether the value is "89" (i.e., 8 (the first blanking number) +80 bytes (i.e., 640 dots) +1). If NO in step S17, the flow returns to step S4, and the next data is received. The first blanking data represents "8" and the vertical data of the first byte in the 640 horizontal dots has been stored. A value obtained by adding one to the current blanking data is set in the LCH 13. The data up to the nine horizontal bytes after the leading edge of the signal H is neglected. Data of 400 Hs from d3 of the 10th byte in FIG. 12 is received in the same manner as in FIG. 12. By repeating the operation described above, the entire CRT frame or scope data of 80 bytes×400 Hs is received. If YES in step S17 in FIG. 11, i.e., the CPU 2 determines that the value of the blanking data reaches "89", video data processing is completed. For example, the time required for this processing is equal to the repetition period of 80 signals V, i.e., about 1.5 seconds, which results in a practical time.

However, if the output from the switch 37 is determined to be logic "0" in step S2, the CPU 2 executes second CRT data processing in step S20 and the subsequent steps. The CPU 2 sends out a signal of level "1" through a signal line out 1 to set the switching circuits 39 to 41 in the second CRT mode (step S20). In other words, the leading timings of the vertical and horizontal sync signals V and H are used as reference timings. The output from the OSC 42 is used as the clock signal. In step S21, the CPU 2 then sets blanking parameter "9" in the LCH 13 through the bus line 23. This parameter is 9-byte count data for neglecting 72-dot data from the leading edge of the signal H in FIG. 10B. When the CPU 2 completes initialization, it detects the signal V. When the signal V is input to the CPU 2 through the Schmitt inverter 15 and the signal line 11, the CPU 2 establishes vertical synchronization on the screen of the second CRT (Step S5'). The same steps as in FIG. 11 are represented by prime marks affixed to the corresponding steps. The CPU 2 then detects the signal H through the Schmitt inverter 16 and the signal line 12. When the CPU 2 counts 15H signals, it sets the signal line 13 at logic "0" to clear the FF 14 (step S10'). The same operation as described above is repeated for 246 scanning lines in step S23. The second CRT screen locations corresponding to the first column data are represented by d1', d2', ... in FIG. 13. The CPU 2 checks in step S24 whether the value of the blanking data is "104" (i.e., 9 (the first blanking number) +94 bytes (i.e., 752 dots) +1). If NO in step S24, the flow returns to step S21, and the next data is received. The first blanking data represents "9" and the first byte data in the 752 horizontal dots has been stored. A value obtained by adding one to the current blanking data is set in the LCH 13. The data up to the ten horizontal bytes after the leading edge of the signal H is neglected. Data of 246 Hs from d3' of the 11th byte in FIG. 13 is received. By repeating the operation described above, the entire second CRT frame or scope data of 94 bytes×246 Hs is received. If YES in step S24, i.e., the CPU 2 determines that the value of the blanking data reaches "104", video data processing is completed. For example, the time required for this processing is equal to the repetition period of about 1.5 seconds, which results in a practical time.

In the above description, the CRT connection mode is switched in response to the input of the switch 31. However, a switching command may be sent from an external device through the PiF in FIG. 9 and may be decoded by the CPU 2 to perform the first and second CRT switching operation.

According to the present invention as described above, a variety of display modes with a simple arrangement and real-time video data processing (about 1.5 to 3 seconds) can be achieved. Even if the video data is modified after processing, the previous video data can be reproduced by printing. The user need not wait for editing the video data until the video data is printed out, thus improving inefficient editing and operability.

According to the present invention, any scanning display system can be compatible with the printer, resulting in economical advantages.

What is claimed is:

1. A video data processing system comprising:

input means for inputting scanned video data;

memory means for storing at least one frame of the video data input by said input means;

memory control means for controlling said memory means so as to divide the input video data into a plurality of columns each having a predetermined amount of the video data in a main-scan direction, and so as to store one of the columns;

blanking data memory means for storing blanking data determining a blank in the main-scan direction;

blanking data updating means for updating the blanking data whenever the one column of the one frame is stored in said memory means;

neglecting means for neglecting one or more columns included in a blank updated by said blanking data updating means; and memory updating means for allowing said memory control means to perform storing operations for the remaining columns other than the one or more columns neglected by said neglecting means.

2. A system according to claim 1, wherein said memory control means receives and retains the video data, wherein the number of bytes of the video data is a multiple of the number of bytes per main scanning cycle.

3. A system according to claim 1, wherein said memory updating means outputs to alarming means a detection signal indicating that the number of subscanning cycles is below a predetermined number.

4. A system according to claim 1, wherein said memory updating means automatically starts to output the video data to an external device when the number of subscanning cycles has reached a predetermined number.

5. A video data processing system comprising:

input means for switching between different scanned video data and inputting one of the different video data;

memory means for storing at least one frame of the video data input by said input means;

memory control means for controlling said memory means for each video data input by said input means so as to divide the input video data into a plurality of columns each having a predetermined amount of the video data in a main-scan direction, and so as to store one of the columns;

blanking data memory means for storing blanking data determining a blank in the main-scan direction;

blanking data updating means for updating the blanking data whenever the one column of the one frame is stored in said memory means;

neglecting means for neglecting one or more columns included in a blank updated by said blanking data updating means; and memory updating means for allowing said memory control means to perform storing operations for the remaining columns other than the one or more columns neglected by said neglecting means.

6. A system according to claim 5, wherein said memory control means receives and holds video data, wherein the number of bytes of the video data is a multiple of the number of bytes per main scanning cycle.

\* \* \* \* \*

UNITED STATES PATENT AND TRADEMARK OFFICE
CERTIFICATE OF CORRECTION

PATENT NO. : 5,479,607

DATED : December 26, 1995

INVENTORS : TASAKI ET AL.

It is certified that error appears in the above-identified patent and that said Letters Patent is hereby corrected as shown below:

[57] ABSTRACT

Line 12, "by" (first occurrence) should be deleted.

COLUMN 3

Line 45, "signal line 42" should read --signal line $\ell 2$--;
Line 47, "signal line 43" should read --signal line $\ell 3$--.

COLUMN 5

Line 3, "interfaced" should read --interlaced--;
Line 5, "Scanning," should read -scanning,--.

Signed and Sealed this

Seventh Day of May, 1996

Attest:

BRUCE LEHMAN

Attesting Officer   Commissioner of Patents and Trademarks